United States Patent [19]
Tanoue

[11] Patent Number: 5,592,577
[45] Date of Patent: Jan. 7, 1997

[54] OPTICAL TRANSMISSION LINE ENABLING DEFINITION OF A FAULT POINT AND A METHOD FOR DEFINING THE FAULT POINT

[75] Inventor: Toshiyuki Tanoue, Kawasaki, Japan

[73] Assignee: Fujitsu Limited, Kanagawa, Japan

[21] Appl. No.: 516,753

[22] Filed: Aug. 18, 1995

[30]     Foreign Application Priority Data

Oct. 21, 1994  [JP]  Japan .................................. 6-256612

[51] Int. Cl.$^6$ .......................... G02B 6/00; G01N 21/00
[52] U.S. Cl. .......................... 385/12; 385/123; 385/100; 356/73.1
[58] Field of Search ................. 385/12, 14, 123, 385/128, 100; 356/73.1

[56]          References Cited

U.S. PATENT DOCUMENTS

| | | | |
|---|---|---|---|
| 4,385,832 | 5/1983 | Doi et al. | 356/73.1 |
| 4,838,690 | 6/1989 | Buckland et al. | 356/73.1 |
| 5,066,118 | 11/1991 | Buerli | 356/73.1 |
| 5,442,434 | 8/1995 | Liao et al. | 356/73.1 |
| 5,450,191 | 9/1995 | Parks et al. | 356/73.1 |
| 5,479,251 | 12/1995 | Hanson | 356/73.1 |

FOREIGN PATENT DOCUMENTS 53-119068  10/1978  Japan ................................ 356/73.1 X

*Primary Examiner*—Brian Healy

[57]          ABSTRACT

In an optical transmission line enabling definition of a fault point thereon and a method for defining the fault point, the optical transmission line includes: a plurality of optical fiber units connected in series in longitudinal direction so as to form the optical transmission line; and each of the optical fiber units having fibers with different parameters. The fault point is defined by inputting pulsed light to one end of the optical transmission line, detecting the change in the intensity of reflected light which is caused by change in the power of back-scattered light based on the difference in the fiber parameters, obtaining a curve of a relationship between change of the intensity and distance scales of the optical transmission line, and representing the relationship on the curve, detecting discontinuous points of the intensity on the curve, each of the discontinuous points can be used as a distance marker in order to measure the distance from the end of the optical transmission line to the fault point.

18 Claims, 7 Drawing Sheets

OPTICAL FIBER

# OPTICAL TRANSMISSION LINE ENABLING DEFINITION OF A FAULT POINT AND A METHOD FOR DEFINING THE FAULT POINT

BACKGROUND OF THE INVENTION

1. Field of the Invention

The present invention relates to an optical transmission line used for a long distance communication. Particularly, it relates to an optical transmission line enabling definition of a fault point and a method for defining (or, locating) the fault point on the optical transmission line. The fault point can be found by detecting discontinuous points on a curve of the relationship between the intensity of a reflected light on the optical transmission line and the distance from an end of the line to each discontinuous point. In general, the discontinuous points are caused by change in the power of the back-scattered light based on change in the parameters of the optical fibers which form the optical transmission line, as explained in detail below.

2. Description of the Related Art

In long distance communication, such as submarine cables, an optical fiber cable is usually utilized as a transmission line, and various data are transmitted in the form of light signals.

When a fault occurs in the optical fiber cable, it is necessary to detect (define) the fault point without removing the cable from the sea bed. Accordingly, as a general method, the distance from an end of the optical fiber cable to a predetermined point is sequentially measured in order to detect change of the intensity of the reflected light so that it is possible to define the distance from the end of the transmission line to the fault point.

In this method, it is necessary to measure the precise distance from the end of the transmission line to the fault point in order to define the exact fault point.

SUMMARY OF THE INVENTION

The object of the present invention is to provide an optical transmission line enabling definition of a fault point and a method for defining the fault point on the optical transmission line.

In accordance with one aspect of the present invention, there is provided a method for defining a fault point on an optical transmission line, including the steps of: providing a plurality of optical fiber units connected in series in longitudinal direction so as to form the optical transmission line, and each optical fiber unit having different fiber parameters; inputting pulsed light to one end of the optical transmission line; detecting a change in an intensity of a reflected light which is caused by change in the power of the back-scattered light based on a difference in the fiber parameters; obtaining a curve of a relationship between the change in the intensity and distance scales of the optical transmission line, and representing the relationship on the curve; detecting discontinuous points in the intensity on the curve; and using each of the discontinuous points as a distance marker in order to measure the distance from the end of the optical transmission line to the fault point.

In accordance with another aspect of the present invention, there is provided an optical transmission line, enabling definition of a fault point therein, including: a plurality of optical fiber units connected in series in longitudinal direction so as to form an optical transmission line; and each of the optical fiber units having different fiber parameters; wherein, the fault point is defined by inputting pulsed light to one end of the optical transmission line; detecting a change of an intensity of a reflected light which is caused by change in the back-scattered light based on the difference of the fiber parameters; obtaining a curve of a relationship between the change of the intensity and the distance scales of the optical transmission line, and representing the relationship on the curve; detecting discontinuous points of the intensity on the curve; and using each of the discontinuous points as a distance marker in order to measure the distance from the end of the optical transmission line to the fault point.

In a preferred embodiment, each of the optical fiber units has two kinds of fibers with different parameters each alternately connected.

In another preferred embodiment, each of the optical fiber units has two kinds of fibers with different parameters each alternately connected and each having the same length.

In still another preferred embodiment, each of said optical fiber units has two kinds of fibers with different parameters each alternately connected, and one optical fiber unit is long and used as a main transmission line and the other is short and used as a distance marker.

In still another preferred embodiment, each of the optical fiber units has two kinds of fibers with different parameters each alternately connected, and one fiber parameter is a large diameter of a core of said optical fiber and the other is a small diameter of the core.

In still another preferred embodiment, each of the optical fiber units has two kinds of fibers with different parameters each alternately connected, and one fiber parameter is a large refractive index of a core of said optical fiber and the other is a small refractive index of the core.

In still another preferred embodiment, an optical transmission line further comprises a plurality of optical fibers, and at least one of the plurality of optical fibers is formed of a plurality of optical fiber units, each connected in series in the longitudinal direction.

DESCRIPTION OF THE PREFERRED EMBODIMENTS

In general, an Optical Time Domain Reflectometer (OTDR) has been known as a most effective equipment for defining the fault point on the optical transmission line. In the OTDR, a laser diode used for a light source is activated in a predetermined period in order to emit constant pulsed light, and the pulsed light is emitted into the optical fiber to be measured.

The reflected light (caused by Fresnel reflection) and the back-scattered light (caused by Rayleigh scattering), which are reflected by the optical fiber, are received by a light receiver which converts the light into electric signals.

Further, the light receiver amplifies the electric signals in order to perform raster scanning in response to a period of light emission. As a result, it is possible to produce a curve indicating the relationship between the intensity of the reflected light and the distance of the optical transmission line.

Figure 1:
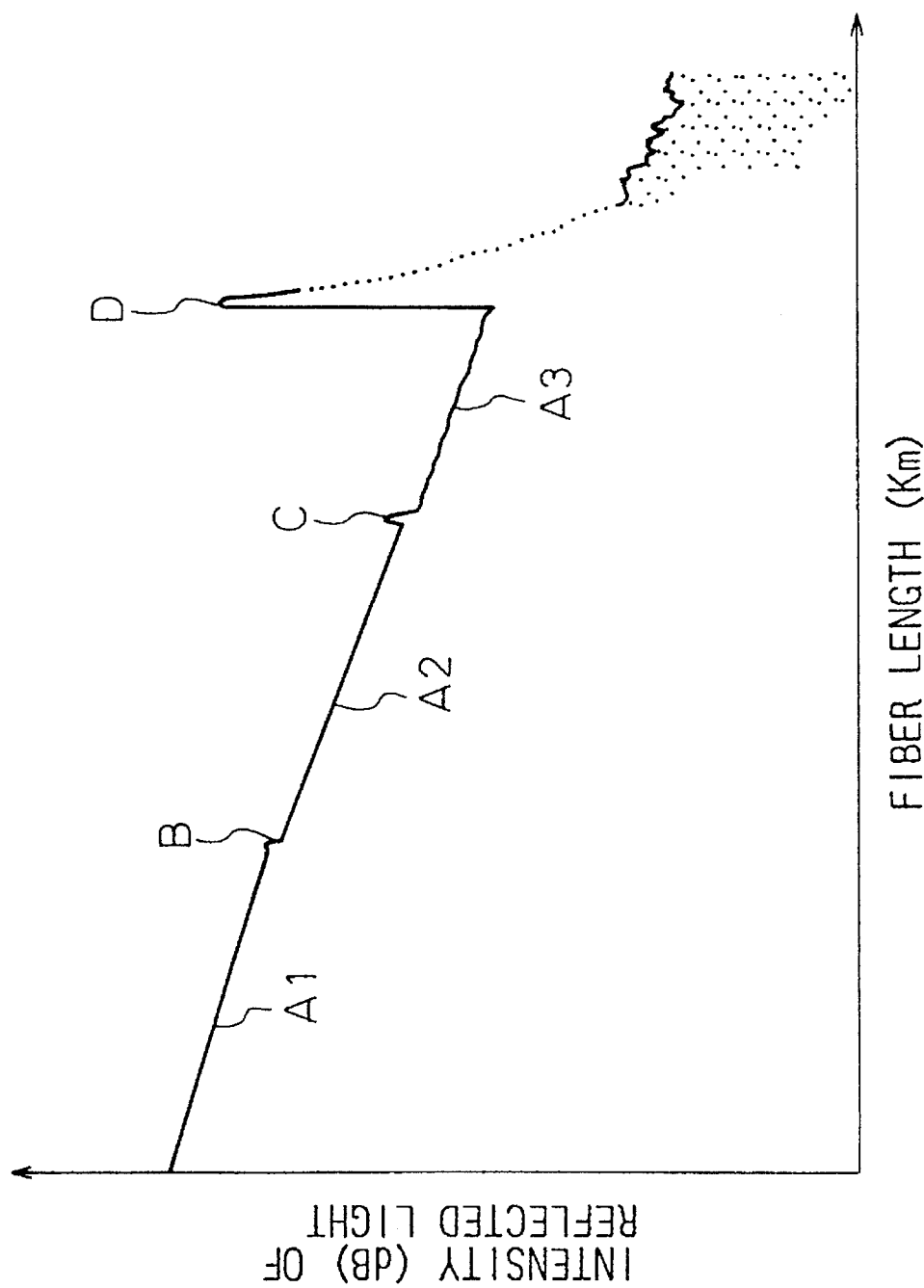
FIG. 1 is a graph for explaining the relationship between the intensity of reflected light and fiber length (distance) observed by an Optical Time Domain Reflectometer (OTDR)

FIG. 1 is a graph for explaining the relationship between the intensity of the reflected light and the fiber length (distance) observed by an Optical Time Domain Reflectometer (OTDR). In the drawing, the ordinate represents the intensity of the reflected light, and an abscissa represents the length (Km) of the optical fiber (i.e., a distance scale). In other word, the abscissa corresponds to the propagation time of the light from the end point. Further, slanted solid lines A1, A2 and A3 represent the transmission loss characteristics of the optical fiber cable caused by the back-scattered light.

Reference letter B represents a discontinuous point caused by a splice of the optical fiber. Reference letter C represents a discontinuous point caused by the Fresnel reflection at a connection portion of the optical fiber. Reference letter D represents a discontinuous point caused by the Fresnel reflection at the end portion or a break point of the optical fiber cable.

When a fault occurs in the optical fiber cable, first, the reflected light is observed using the OTDR. As a result of the observation, since the feature of the reflected light caused by the Fresnel reflection is clearly seen on the curve, it is possible to easily define the fault point on the optical transmission line.

However, when defining the fault point on the optical fiber cable, there is an error in the measurement of the distance from the end portion to the fault point caused by dispersion of a refractive index of the optical fiber cable. For example, the error in the measurement using the OTDR occurs due to the following reasons.

In the OTDR, the distance L on the ordinate is calculated as follows.

$$L = (C \times T)/(2 \times n_1) \quad (1)$$

Where,

C is the velocity of light.

T is a time from when the pulsed light is emitted into the optical fiber until the back-scattered light is returned.

$n_1$ is a refractive index of a core of an optical fiber.

In this case, it is assumed that the optical fiber has a uniform refractive index $n_1$.

However, in the measurement using the OTDR, the distance scales are determined as if the core of the optical fiber has the uniform refractive index. Accordingly, if the refractive index $n_1$ of the core is un-uniform, i.e., the refractive index $n_1$ fluctuates, in the longitudinal direction of the optical fiber, the resultant data measured by the OTDR includes an error in the measurement of the distance.

The error in the measurement of the distance from the end portion to the fault point may reach 10% as the maximum value when using the OTDR. For example, when a distance interval (i.e., one interval of the optical fiber cable) to be relayed becomes about 140 Km, the error becomes very large so that it reaches a non-negligible level as explained below.

As a result of the error in the distance, there is large difference between an actual distance and the defined distance from the end portion to the fault point. Accordingly, a lot of time is required for finding the fault point and repairing it. Further, a large amount of cable may be wasted in the repair of the fault point.

On the other hand, in the Japanese unexamined patent publication (Kokai) No. 53-119068, a method is disclosed for defining the fault point on the optical cable in such a way that a plurality of constant reflection points, each of which generates the reflected light having a constant amplitude, are provided on the optical transmission line so that the fault point on the optical cable can be presumed.

According to the above method, the feature lies in that a connector of any material, or an air gap, having a refractive index which is different from that of the optical fiber, is inserted into a connector. Further, the constant reflection points are provided by utilizing the reflected light caused by the Fresnel reflection which is generated at the connection surface. Still further, the optical fiber cable is divided into a plurality of sections (i.e., optical fiber units) each including a constant reflection point. As a result, it is possible to presume the section of the fault point of the optical fiber cable by detecting the presence or absence of the reflected light from the constant reflection point and the increment in the transmission loss.

There are, however, some problems in this method. For example, the transmission loss at the connection point becomes large. In the case of the air gap, since the transmission loss of the signal level becomes about 0.3 dB in each constant reflection point, each repeater must be set at the shorter interval in order to compensate for the transmission loss.

For example, it is assumed that the constant reflection point is provided for every 10 Km. On the other hand, in general, the repeater is provided for every 80 Km when employing a light amplifier method, and provided for every 140 Km when employing a reproducing repeater method. Accordingly, the transmission loss at the constant reflection point becomes 2.1 dB in the former method, and becomes 3.9 dB in the latter method. Therefore, when taking into account the transmission loss of about 0.3 dB per 10 Km, the repeater must be provided for every 69.5 Km in the former method, and 120.5 Km in the latter method.

Further, since the definition of the fault point is performed based on the measurement of the distance between the incident end of the light and the fault point, the longer the interval between the repeaters, the worse the precision of the measurement.

Accordingly, the present invention aims to resolve the above problems. In the present invention, when defining the fault point on the optical fiber cable using an OTDR, it is possible to raise the precision of the measurement of the distance from the end point of the optical fiber cable to the fault point without reducing the interval between the repeaters as explained in detail below.

The present invention is explained in detail, with reference to FIGS. 2 to 14, below.

(1) In a method for defining a fault point on an optical transmission line according to the present invention, two kinds of optical fibers each having different fiber parameters, are connected in series in the longitudinal direction, and pulsed light is irradiated from the end portion of the optical fiber. In this case, the back-scattered light at each connection point is changed in accordance with change of the fiber parameter, and, at that time, the intensity of the reflected light is also changed with the time. Further, the change of the intensity of the reflected light is converted to distance scales. Still further, discontinuous points on the distance scales are used as distance markers, and the distance to the fault point is measured based on the distance markers.

(2) The optical transmission line according to the present invention includes a plurality of two optical fiber units which are connected in series in the longitudinal direction and have different fiber parameters. When the pulsed light is received from the end of the optical fiber, the discontinuous points are found in accordance with the change of the intensity of the reflected light based on change of the intensity of the back-scattered light in accordance with different fiber parameters.

(3) In the present invention, the optical transmission line is formed of a plurality of two kinds of optical fiber units each alternately connected in series in the longitudinal direction and each having different fiber parameters.

(4) In the present invention, the optical transmission line is formed of a plurality of two kinds of optical fiber units each alternately connected in the longitudinal direction, and each having the same length and different fiber parameters.

(5) In above item (3), one kind of optical fiber unit is longer and is used as the main optical transmission line, and the other kind of optical fiber unit is shorter and is used as the distance marker, and each is alternately connected in the longitudinal direction so as to form the optical transmission line.

(6) In above items (3) to (5), the two kinds of optical fibers have large and small core diameters as the fiber parameters.

(7) In above items (3) to (5), the two kinds of optical fibers have large and small refractive indexes as the fiber parameters.

(8) In above items (3) to (5), two kinds of optical fibers are formed of a set of two cores having large and small diameters and two cores having large and small refractive indexes. In this case, the cores have the same difference in the relative refractive index between the core and the clad, and are alternately connected in series in the longitudinal direction.

(9) In above items (2) to (8), the optical fiber cable (i.e., optical transmission line) includes one or more optical fibers having the above structures (1) to (8).

In a method for defining the fault point in the optical transmission line according to the present invention, a change in a predetermined range, which does not have any influence on the transmission characteristics, is previously applied to the characteristics of the optical fiber in each length of the optical fiber cable.

As a result, since the intensity (or power) of the back-scattered light based on the Rayleigh scattering is increased or decreased, the change in transmission loss or gain at the connection point having predetermined range appears to occur on the intensity of the reflection wave when the characteristics are measured by the OTDR, although there is no connection loss or gain in actuality.

As a explained above, the change of the transmission loss or gain of the intensity of the reflected light is caused by the fluctuation in the power of the back scattered light which is measured by the OTDR since the density of the light power is changed within the core.

That is, when the light is irradiated from the end of the fiber, Rayleigh scattered light, which is proportional to the density of the incident light power, occurs at each of points on the optical fiber. The OTDR utilizes the above fact. That is, when the pulsed light is received from the end of the optical fiber, the Rayleigh scattered light which occurs at each point, is measured regarding the intensity of the reflected light and the time necessary for return to the incident end of the fiber. The result of measurement is displayed on a screen so that it is possible to measure the transmission loss distribution in the longitudinal direction of the optical fiber cable.

The light power of the Rayleigh scattering light is shown as follows.

$$P = \alpha \times p/(n_1^3 \times (n_1^2 - n_2^2)) \qquad (2)$$

Where,

α: wavelength of light determined by pulse width of incident light

P: density of power of incident light $n_1$: refractive index of core of optical fiber $n_2$: refractive index of clad of optical fiber For example, when the diameter of the core is changed in the range of ±10%, the cross sectional area of the core is changed in the range from 81% to 121%. Accordingly, the value P in the formula (2) is also changed in the range from 81% to 121%, the difference ΔP of the power of the Rayleigh scattered light can be expressed as follows.

$$\begin{aligned} \Delta P &= 10 \times \log_{10}(P_{121}/P_{81}) \\ &= 1.7 \text{ dB} \end{aligned} \qquad (3)$$

On the other hand, when the refractive index $n_1$ of the core is changed in the range of ±5%, the value $n_1^3$ is changed in the range from 86% to 161%, but the value $(n_1^2 - n_2^2)$ is not changed. As mentioned above, when the value P is changed in the range from 86% to 161%, the difference ΔP of the power of the Rayleigh scattering light can be expressed as follows.

$$\begin{aligned} \Delta P &= 10 \times \log_{10}(P_{116}/P_{86}) \\ &= 1.3 \text{ dB} \end{aligned} \qquad (4)$$

Since the above change in the intensity of the reflection wave with time is shown as step-like characteristics on the screen of the OTDR, this step-like characteristics can be utilized as a reference (distance marker) on the distance scale. Accordingly, if each position of the distance marker corresponds to the actual length of the optical fiber cable, the distance from the marker which is the nearest to the fault point is measured, using the OTDR, when defining the fault point.

In this case, since an error which may occur in the measurement only corresponds to the distance from the nearest distance marker to the fault point, it is possible to considerably reduce the error compared to the error which occurs when the whole optical transmission line is used as in the conventional art.

Figure 2:
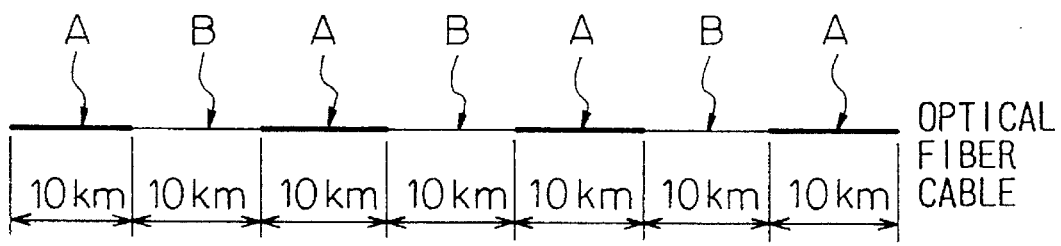
FIG. 2 shows a schematic structure of an optical transmission line according to a first embodiment of the present invention.
Figure 3:
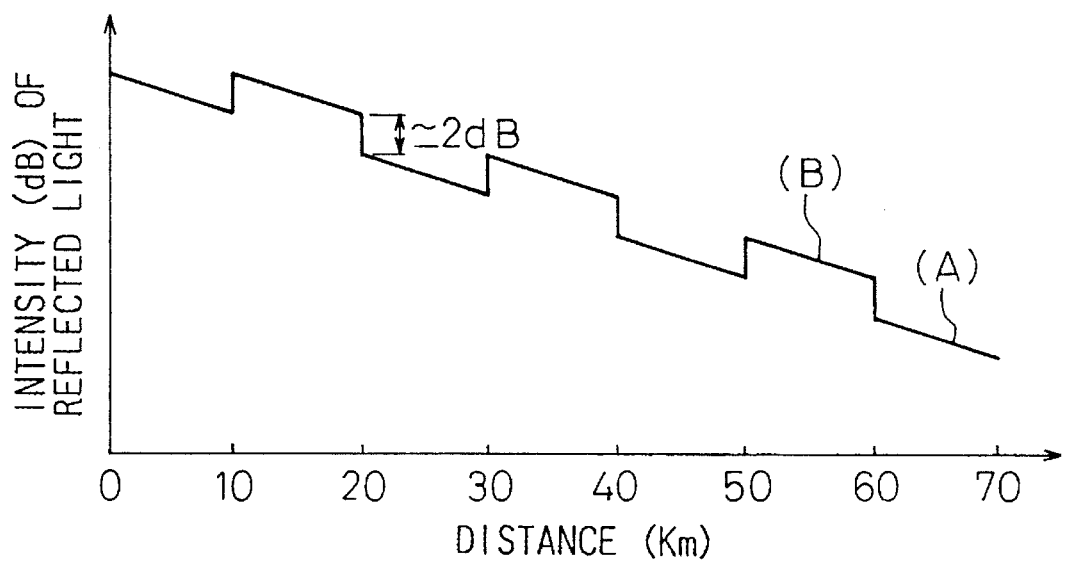
FIG. 3 is a graph for explaining resultant data of the measurement of the intensity of the reflected light using the OTDR in the optical transmission line shown in FIG. 2, and for explaining the relationship between the intensity of the reflected light and the length of the optical transmission line.

FIG. 2 shows a schematic structure of the optical transmission line according to the first embodiment of the present invention, and FIG. 3 is a graph for explaining the resultant data of the measurement of the intensity of the reflected light, using the OTDR, in the optical transmission line shown in FIG. 2, and for explaining the relationship between the intensity of the reflected light and the length of the optical transmission line.

In general, the manufacturing margin of an outer diameter of the core of the optical fiber is within ±10% since this margin does not affect any characteristics of the optical fiber.

The present invention utilizes this manufacturing margin. That is, two kinds of optical fibers are provided by utilizing this margin. That is, one outer diameter is 10% larger than a nominal diameter D (i.e., D +10%), and the other outer diameter is 10% smaller than the nominal diameter D (i.e., D −10%).

In FIG. 2, "A" denotes an optical fiber unit having a large core diameter (D +10%), and "B" denotes the optical fiber unit having a small core diameter (D −10%). The optical fiber cable is formed by a plurality of optical fiber units having the type A and type B alternately connected in series in the longitudinal direction. In this embodiment, a length of the type A is equal to that of the type B, and each length is 10 Km.

In FIG. 3, the ordinate denotes the intensity (dB) of the reflected light, and the abscissa denotes the distance (Km). As a result of measurement, shown in the graph, the intensity decreases in accordance with the distance. Further, the transmission loss or gain of about 2 dB can be detected as the difference between the type A and type B.

Since above change of the transmission loss or gain occurs corresponding to the actual length of the optical transmission line, this change can be utilized as the distance marker. As mentioned above, the change of the diameter of the core corresponds to the change in the transmission loss or the gain of the waveform on the OTDR. This is because the power density of the light is changed in the core, and the power of the Rayleigh scattering light fluctuates the measurement of the OTDR. The fluctuation is shown by the formula (3).

Figure 4:
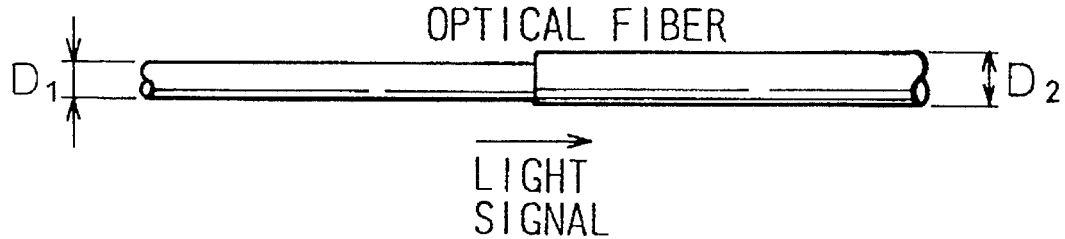
FIG. 4 shows a schematic structure of the optical transmission line having two different diameters, as fiber parameters, each connected in series shown in FIG. 2.
Figure 5:
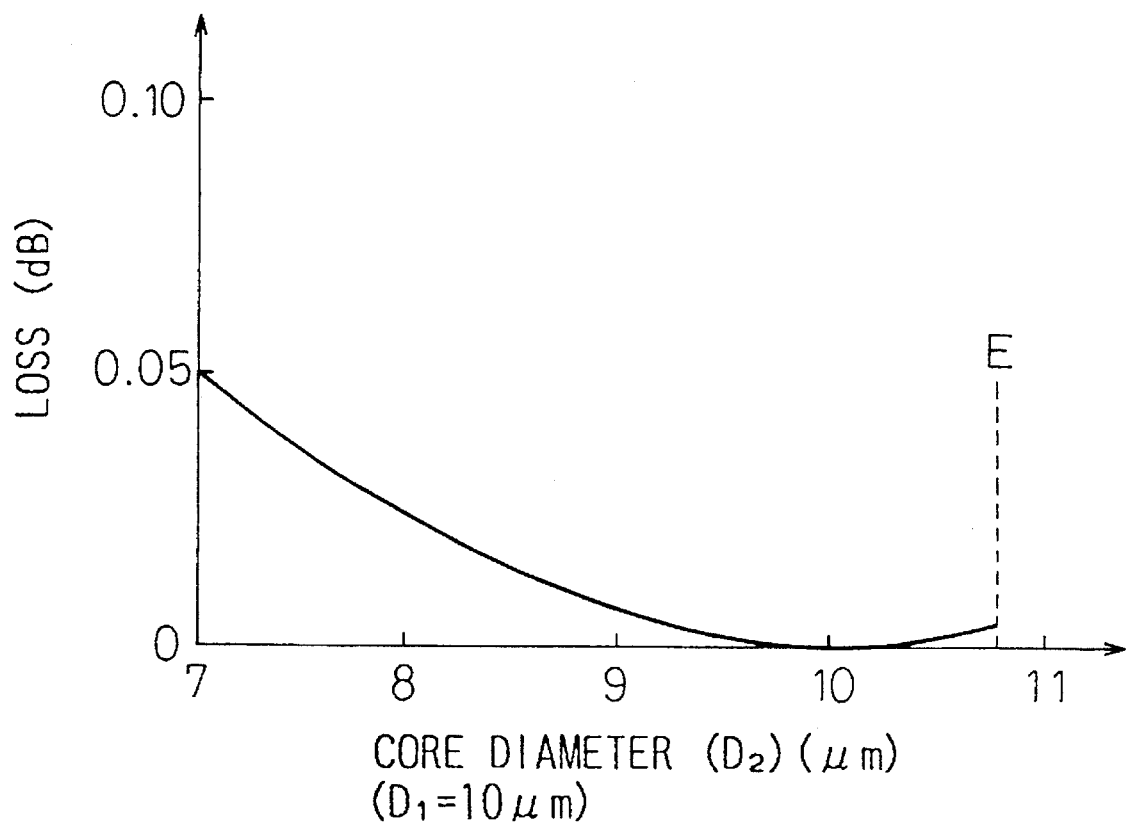
FIG. 5 is a graph for explaining the relationship between transmission loss and the diameter of a core of the optical fiber shown in FIG. 4.

FIG. 4 shows a schematic structure of the optical transmission line having two different diameters as fiber parameters each connected in series shown in FIG. 2, and FIG. 5 is a graph for explaining relationship between the transmission loss and the diameter of the core of the optical fiber shown in FIG. 4. In FIG. 4, the thick optical cable has the diameter $D_2$, and the thin optical cable has the diameter $D_1$. The core diameter $D_1$ is provided at an input side, and the core diameter $D_2$ is provided at an output side.

In FIG. 5, the ordinate denotes the transmission loss (dB), and the abscissa denotes the core diameter (μm). In this graph, the core diameter $D_1$ is fixed at 10 μm, and the core diameter $D_2$ is changed in the range from 7 μm to 11 μm. As is obvious from the graph, when the change of the diameter of the core is ±10%, the change of the transmission loss is in the range from 0.01 dB to 0.02 dB.

This graph assumes the same difference in the relative refractive index, $\Delta n_1 = \Delta n_2 = 0.2\%$, between the core and the clad. The reference letter E shows a cut-off diameter of the core which is determined based on the wavelength of the light. The transmission becomes impossible above this cut-off diameter.

Figure 6:
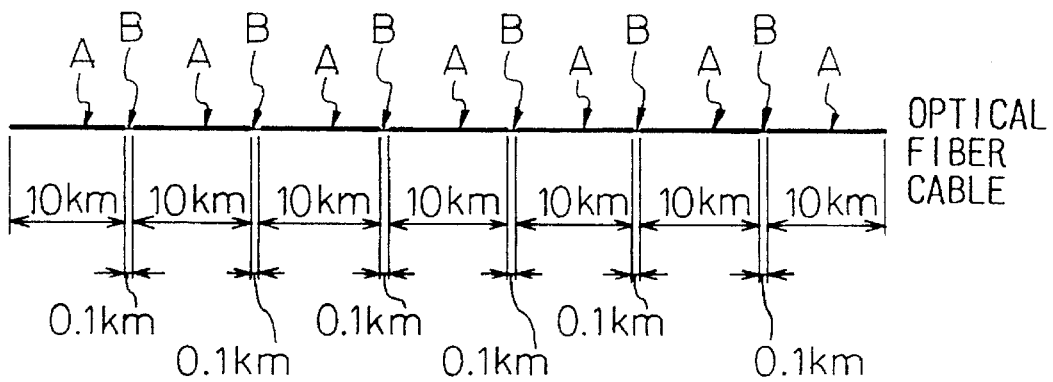
FIG. 6 shows a schematic structure of the optical transmission line according to a second embodiment of the present invention.
Figure 7:
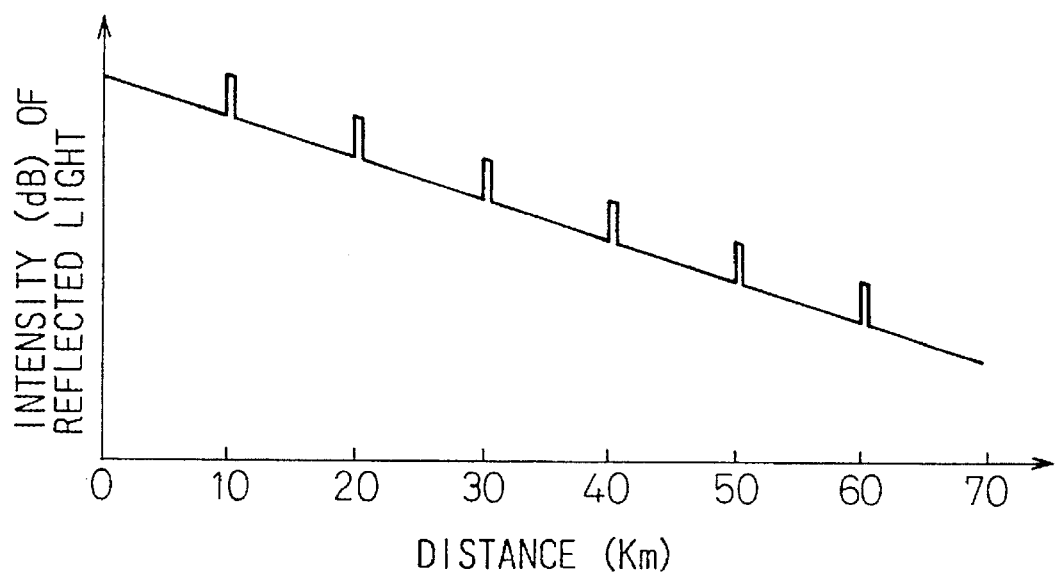
FIG. 7 is a graph for explaining resultant data of the measurement of the intensity of the reflected light using the OTDR in the optical transmission line shown in FIG. 6, and for explaining the relationship between the intensity of the reflected light and the length of the optical transmission line.

FIG. 6 shows a schematic structure of the optical transmission line according to the second embodiment of the present invention, and FIG. 7 is a graph explaining resultant measurement of the intensity of the reflected light, using the OTDR, in the optical transmission line shown in FIG. 6, and for explaining the relationship between the intensity of the reflected light and the length of the optical transmission line.

In FIG. 6, each thick line denotes an optical fiber unit of type A, and each thin line denotes an optical fiber unit of type B. In the second embodiment, the type A fiber is used as the main transmission line, and the type B fiber is used as the distance marker. For example, the length of the type A is about 10 Km, and the length of the type B is about 0.1 Km (i.e., 100 m). As shown in the drawing, the optical transmission line according to the present invention is formed of a plurality of optical fiber units of type A and the type B each alternately connected in series.

In FIG. 7, the ordinate denotes the intensity of the reflected light, and the abscissa denotes the distance. As is obvious, a strong pulse of reflected light is shown at each point which is used as the distance marker. As an effect of this structure, it is possible to reduce the influence which affects the transmission characteristics compared to the first embodiment.

FIGS. 8 to 13 are views for explaining basic structure of the present invention. In these drawings, P1 to P4 denote fiber parameters. For example, the fiber parameter is defined by the refractive index, the core diameter, etc. Briefly, each structure is as follows.

Figure 8:
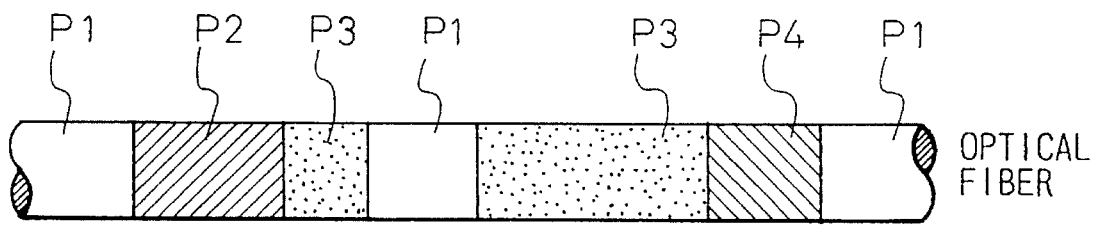
FIGS. 8 to 13 are views for explaining the basic structures of the optical fiber according to the present invention.

In FIG. 8, a plurality of optical fiber units each having different fiber parameters P1 to P4 are connected in series each other in order to form the optical transmission line.

Figure 9:
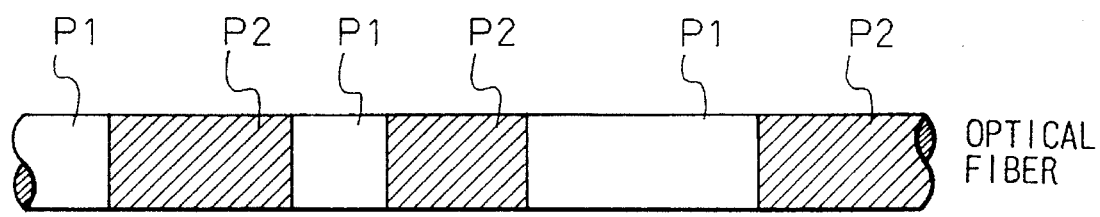

In FIG. 9, two kinds of optical fibers each having different parameters P1 and P2 and different length are connected in series in order to form the optical transmission line.

Figure 10:
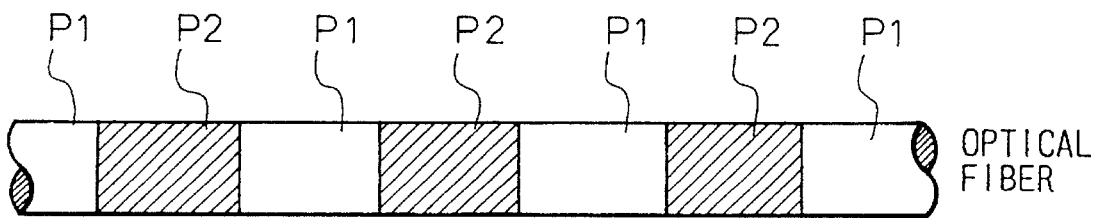

In FIG. 10, two kinds of optical fibers each having different parameters P1 and P2, but the same length are connected in series in order to form the optical transmission line.

Figure 11:
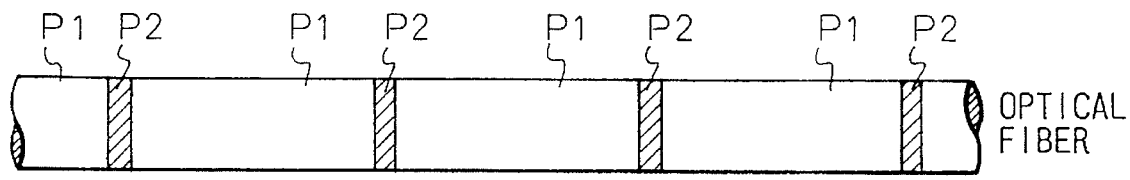

In FIG. 11, two kinds of optical fibers each having different parameters P1 and P2 and different length are connected in series in order to form the optical transmission line. In this embodiment, the length of the optical fiber having the parameter P1 is very long compared to the length of the optical fiber having the parameter P2. Accordingly, the optical fiber having the parameter P1 is used as the main transmission line. On the other hand, the optical fiber having the parameter P2 is used as the marker to measure the distance.

Figure 12:
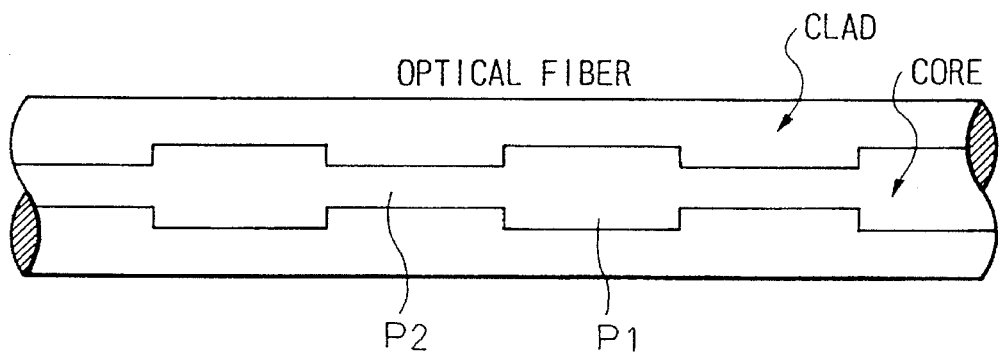

In FIG. 12, the fiber parameters are the core diameters. In this case, the fiber parameter P1 is the large core diameter, and the fiber parameter P2 is the small fiber parameter. The two kinds of cores have the same length so that this embodiment is similar to the structure of FIG. 10.

Figure 13:
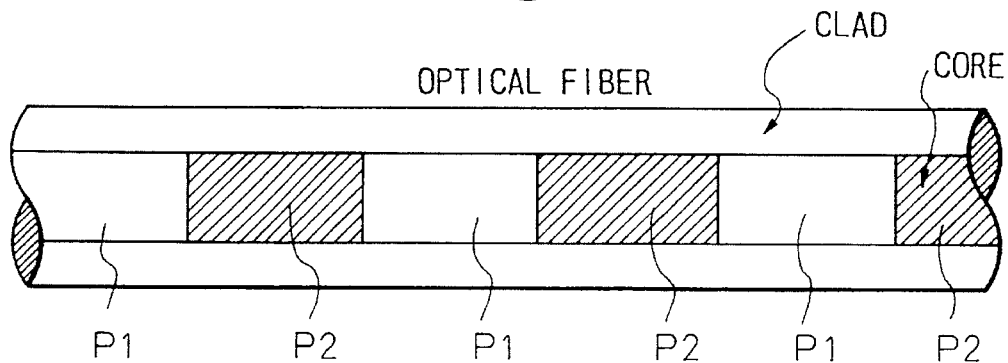

In FIG. 13, the fiber parameters are the refractive index. In this case, the fiber parameter P1 is one refractive index, and the fiber parameter P2 is the other refractive index. The two kinds of cores have the same length so that this embodiment is similar to the structure of FIG. 10.

Figure 14:
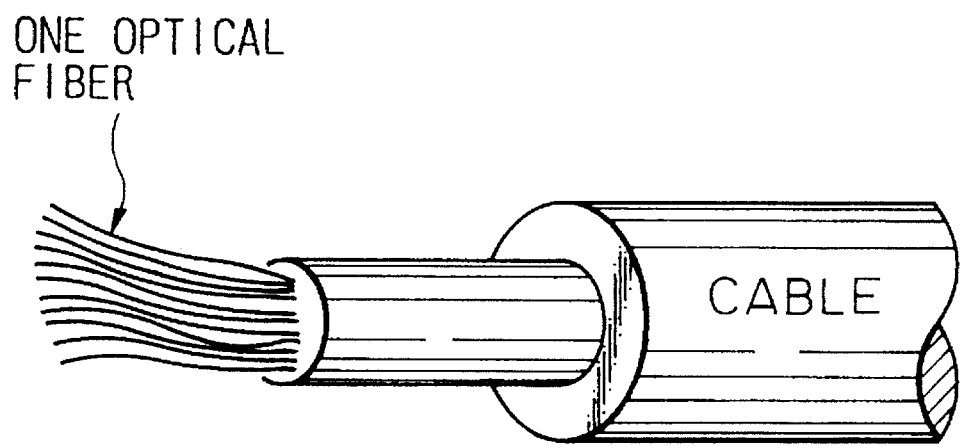
FIG. 14 shows one example of an optical fiber cable using the present invention.

In FIG. 14, the optical fiber cable is formed by a plurality of optical fibers, and the present invention is applied to one of the optical fibers.

Each embodiment will be explained in detail below.

A third embodiment of the present invention is shown in FIGS. 10 and 13. In the third embodiment, two kinds of the optical fibers each having a different refractive index are provided without changing the difference of the relative refractive index between the core and the clad. The two kinds of the optical fibers are provided alternately as in the first embodiment.

In this case, based on the fluctuation of the power of the Rayleigh scattered light caused by the difference of the refractive index, and since the change of the transmission loss or gain expressed by the formula (4) for each change of the refractive index occurs on the characteristic graph of intensity, each change point can be used as a distance marker to define the fault point in the optical transmission line.

A fourth embodiment of the present invention is shown in FIG. 11. In the fourth embodiment, two kinds of the optical fibers each having a different refractive index and different lengths are provided without changing the difference in the relative refractive index between the core and the clad. The two kinds of the optical fibers are provided alternately as in the second embodiment. In this case, the long optical fiber is used as the main optical fiber cable and the short optical fiber is used as the distance marker, and these are provided alternately.

In this case, based on the fluctuation of the power of the Rayleigh scattered light caused by the difference of the refractive index, since the change of the transmission loss or gain expressed by the formula (4) for each change of the refractive index occurs on the characteristic graph of the intensity, each change point can be used as a distance marker to define the fault point on the optical transmission line.

Since the length of the optical fiber cable used as the distance marker is very short compared to the main optical cable, it is possible to reduce the influence which affects the characteristics in comparison with the third embodiment. In the third and forth embodiments, when changing the refractive index of the core, if the difference of the relative refractive index between the core and the clad is slightly changed, there is no problem regarding the characteristics of the optical transmission line.

A fifth embodiment of the present invention is shown in FIGS. 12 and 13. In the fifth embodiment, two kinds of optical fibers, each having a different diameter and each having a different refractive index are provided without changing the difference in the relative refractive index between the core and the clad. Further, the two kinds of optical fibers are alternately provided at equal intervals as in the first embodiment.

In this case, the fluctuations in the power of the Rayleigh scattered light caused by either the change of the diameter of the core, or the difference of the refractive index, occur at the same time. As in the first embodiment, since the change in the loss or gain occurs at each change of the diameter and the refractive index on the characteristic graph, each change of the loss or gain is used as the marker so that it is possible to locate the fault point on the optical transmission line.

According to the fifth embodiment, since it is possible to reduce the change of the diameter and the refractive index (as mentioned above, this change is necessary for obtaining a change in the transmission loss or gain) compared to other embodiments, it is possible to reduce its influence on the characteristics of the optical transmission line.

A sixth embodiment of the present invention is shown in FIGS. 11 and 12. In the sixth embodiment, two kinds of optical fibers, each having a different diameter and each having a different refractive index are provided without changing the difference in the relative refractive index between the core and the clad. Further, two kinds of the optical fibers are alternately provided as in the second embodiment. That is, one is used as the main optical cable, and the other is used as the marker.

In this case, the fluctuations in the power of the Rayleigh scattered light caused by either the change of the diameter of the core, or the difference of the refractive index, are occurred in the same time. As in the second embodiment, since the change in loss or gain occurs at each change in the diameter and the refractive index on the characteristic graph, each change of the loss or gain is used as a marker so that it is possible to define the fault point on the optical transmission line.

According to the sixth embodiment, since it is possible to reduce the change in the diameter and in the refractive index (as mentioned above, this change is necessary to obtain the change in the transmission loss or gain) compared to other embodiments, it is possible to considerably reduce the influence on the characteristics of the optical transmission line because the length of the cable used as the marker is very short compared to the length of the main cable.

In general, the optical fiber cable is formed of a plurality of optical fibers. Accordingly, when applying the present invention to the optical cable, the present invention may be applied to one of the optical fibers, and normal-type fibers are applied to other fibers.

I claim:

1. A method for defining a fault point in an optical transmission line, comprising the steps of:

providing an optical transmission line including a plurality of optical fiber units connected in series in the longitudinal direction, each optical fiber unit being of a predetermined length and having fiber parameters different from adjacent fiber units;

inputting pulsed light to one end of said optical transmission line;

detecting change of an intensity of reflected light, said change being caused by change in the power of back-scattered light based on the difference in the fiber parameters;

obtaining a curve of a relationship between the change in the intensity and distance scales of said optical transmission line, and representing the relationship on the curve;

detecting discontinuous points in the intensity on the curve, said discontinuous points resulting from connections between adjacent fiber units; and using each of said discontinuous points as a distance marker to measure a distance from the end of said optical transmission line to a fault point occurring on said transmission line.

2. An optical transmission line having length and ends, for enabling definition of a fault point located between said ends, comprising:

a first plurality of optical fiber units connected in series in the longitudinal direction between said ends; and each of said optical fiber units having a predetermined length and fiber parameters different from adjacent fiber units;

wherein, a fault point is defined by inputting pulsed light to one said end of said optical transmission line; detecting a change in the intensity of a reflected light which is caused by a change in the power of the back-scattered light based on the difference in the fiber parameter; obtaining a curve of a relationship between the change in the intensity and the distance scales of said optical transmission line, and representing the relationship on the curve; detecting discontinuous points of the intensity on the curve, said discontinuous points being caused by connections between adjacent fiber units, and using each of said discontinuous points as a distance marker in order to measure a distance from the end of said optical transmission line to the fault point.

3. An optical transmission line, as claimed in claim 2, wherein said optical fiber units are of two kinds having respective fibers with different parameters, said fiber units being alternately connected.

4. An optical transmission line as claimed in claim 3, wherein each of said optical fiber units has the same length.

5. An optical transmission line as claimed in claim 3, wherein one said kind of optical fiber unit is longer for use as a main transmission line and the other kind is shorter for use as a distance marker.

6. An optical transmission line as claimed in claim 3, wherein one said fiber parameter is a large core diameter of said optical fiber and the other said fiber parameter is a small core diameter.

7. An optical transmission line as claimed in claim 3, wherein one said fiber parameter is a large refractive index of a core of said optical fiber and the other said parameter is a small refractive index of the core.

8. An optical transmission line as claimed in claim 2 further comprising a plurality of optical fibers in parallel with said first plurality of connected fiber units.

9. An optical transmission line, having a length L between ends, for enabling definition of a fault point located between said ends, comprising:

a plurality of optical fiber units including fibers, said fiber units being connected in series in the longitudinal direction between said ends; and each of said optical fiber units having a respective predetermined length less than L and fiber parameters different from adjacent fiber units, connections between adjacent fiber units producing discontinuous points of intensity on an ODTR trace, said discontinuous points being suitable as markers of known distances on said trace.

10. An optical transmission line, as in claim 9, wherein said optical fiber units are of two kinds having respective fibers with different parameters, said fiber units being alternately connected in series.

11. An optical transmission line as in claim 10, wherein each of said optical fiber units has the same length.

12. An optical transmission line as in claim 10, wherein one said kind of optical fiber unit is longer for use as a main transmission line, the other kind of optical fiber unit is shorter for use as a distance marker.

13. An optical transmission line as claimed in claim 10, wherein one said fiber parameter is a large core diameter of said optical fiber and the other said fiber parameter is a small core diameter.

14. An optical transmission line as in claim 9, wherein one said fiber parameter is a large refractive index of a core of said optical fiber and the other said parameter is a small refractive index of the core.

15. An optical transmission line as in claim 9, wherein the are N fiber units, N being an integer at least equal to 5.

16. An optical transmission line as in claim 9, wherein said optical fiber units are of more than two kinds having respective fibers with different parameters.

17. An optical transmission line as in claim 16, wherein said parameters include at least one of fiber length, fiber diameter, and refractive index.

18. An optical transmission line as in claim 9, wherein a combined length of any two adjacent fiber units is less than 0.33 L.

* * * * *